Patented June 10, 1952

2,600,004

UNITED STATES PATENT OFFICE 2,600,004

FLUORESCENT OPTICAL BLEACHING AGENTS

Stanley Earl Krahler, Holly Oak Terrace, Del., assignor to E. I. du Pont de Nemours and Company, Wilmington, Del., a corporation of Delaware No Drawing. Application June 18, 1951, Serial No. 232,243

3 Claims. (Cl. 252—301.2)

This invention relates to novel organic compounds having fluorescent properties. It is an object of this invention to provide novel fluorescent agents characterized by a distinctive shade of fluorescence and useful for shading other fluorescent agents which are now in commercial use. Additional objects and advantages of this invention will appear as the description proceeds.

Among the various fluorescence agents for textile fiber now on the market, the disodium salt of 4,4' - bis(2,4 - dimethoxy-benzoylamino) -stilbene - 2,2' - disulfonic acid has attained special prominence in view of its high potency, desirable blue shade, good affinity for cellulosic fiber and good fastness to bleach. This compound and its preparation are described more fully in copending application of W. W. Wirth and S. E. Krahler, Serial No. 54,814. The blue-fluorescent shade which this compound develops when illuminated by ultra-violet light is desirable, because it overcomes the natural yellowish shade of bleached cotton, giving the latter a whiter appearance when viewed in daylight. This whitening effect, however, is valuable only as long as the concentration of the fluorescent agent itself upon the fiber is not too great. If heavier dyeings than a certain optimum are applied, the textile fiber may assume a pinkish cast when viewed in daylight, due to the deeply blue fluorescence of the agent, bordering on the violet.

Another agent now on the market which tends to develop a pinkish cast when applied in relatively heavy concentrations is 4,4' - bis(phenylureido) - stilbene - 2,2'-di(sodiumsulfonate), obtained according to German Patent No. 746,569.

To overcome the above tendency to pinkishness by admixing the blue-fluorescent agent in question with one of a different shade is not so simple a problem as it sounds off-hand. The adjuvant must not only be a fluorescent of the requisite shade to counter-balance the pinkish cast of the principal fluorescent agent, but it must have also at least the following additional properties.

1. It must have exhaust properties similar to those of the principal agent, so as to avoid shade changes due to unequal exhaust.

2. It must be essentially equal to the principal agent in fastness properties when on the fiber, so as to avoid shade changes due to laundry or unequal fading.

Now, according to this invention new fluorescent agents are synthesized which possess properties satisfying to a high degree all the aforementioned pre-requisites and characteristics. These new fluorescents are the chemical compounds obtained by acylating 4,4'-diamino-stilbene-2,2' - disulfonic acid with 3 - methoxy - 2-naphthoic acid or its chloride to produce the corresponding bis-amide. More particularly, the novel fluorescent agents of this invention may be expressed by the general formula—

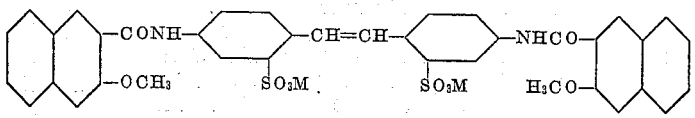

wherein M stands for a cationic member selected from the group consisting of hydrogen, the alkali-metals, and the ammonium radical.

The novel compounds may be prepared by methods which are per se known in the art, for instance by reacting with 2 moles of 3-methoxy-2-naphthoyl chloride upon substantially 1 mole of 4,4'-diamino-stilbene-2,2'-disulfonic acid in a medium of pyridine, which may or may not be admixed with an inert organic solvent such as toluene. Or, if desired, 3-methoxy-2-naphthoic acid may be used in lieu of the acid chloride, in which event an acid halogenating agent, such as phosphorus trichloride, phosphorus oxychloride or thionyl chloride, is added to the reaction mass. In lieu of pyridine, a mixture of a tertiary base such as dimethyl- or diethyl-cyclohexylamine, and an inert diluent, such as toluene or xylene, may be employed, and the entire procedure may then follow the details set forth in U. S. P. 2,497,130 and 2,497,131.

Without limiting my invention, the following examples are given to illustrate my preferred mode of operation. Parts mentioned are by weight.

*Example 1*

A mixture of 17 parts of 4,4'-diaminostilbene-2,2'-disulfonic acid, 32 parts of 3-methoxy-2-naphthoyl chloride and 198 parts of pyridine is heated at reflux for 2 hours. At the end of this time, the reaction is essentially complete as shown by no color formation on treatment of a small portion of the reaction mixture with cold nitrous acid and alkaline R-salt; the formation of a purple color indicates the presence of unreacted aminostilbenedisulfonic acid and incomplete reaction. The hot mixture is drowned into 1,000 parts of water, and made just alkaline with 7 parts of sodium hydroxide. The drowned product is treated with 100 g. of salt, filtered, washed free of excess alkali with 5% salt solution and dried. By nitrogen and sulfur determinations, it analyzes 58% pure as sodium-4,4'-bis(3-methoxy-2-naphthoylamino)-stilbene-2,2'-disulfonate, the remaining 42% being inert materials. Cellulosic fibers which have been treated with a highly dilute aqueous solution of the product show an intense whitish-blue fluorescence when viewed under ultra-violet light in the substantial absence of daylight.

The treatments for the aforementioned purpose were effected using 40 p. p. m. (0.004%) of the dye (based on the fiber weight) at 50:1 water to cloth ratio. The dye bath contained 0.15% fluorescent-free synthetic detergent of the long-chain-alkyl aryl-sulfonate type (based on the water used). The dyeing time was 20 minutes at 130° F. The treated cloths were rinsed in water and air dried.

*Example 2*

A mixture of 83 parts of 4,4'-diaminostilbene-2,2'- disulfonic acid, 100 parts of 3-methoxy-2-naphthoic acid, 48.9 parts of phosphorus oxychloride and 455 parts of pyridine is heated at reflux for 1 hour. At the end of this time, the reaction is essentially complete as shown by the nitrous acid-R-salt test of Example 1. The hot mixture is drowned into 88 parts of sodium hydroxide and 1010 parts of water at 70° C. The resulting mixture is distilled by passing live steam through it until the temperature of the effluent vapors has reached 100.5° C. and has held at this temperature for 10 minutes. The mixture is then filtered at 90°–100° C., and the filter cake is washed with 200 parts of 5% sodium chloride brine solution. The filter cake is suspended in 2000 parts of 5% brine solution, made just alkaline to Clayton Yellow paper, heated at 95°–100° C. for 5 minutes and filtered. The product is washed with 2000 parts of 5% brine and dried. Analysis for nitrogen and sulfur shows the product to have a purity of 97% as sodium-4,4'-bis(3-methoxy-2-naphthoylamino)-stilbene-2,2'-disulfonate.

The product isolated in the above examples is the disodium salt. The free disulfonic acid may be prepared therefrom by treatment with hot dilute mineral acid. By treatment of the free acid with aqueous solutions of the corresponding bases, other desirable salts may be prepared, for instance the dipotassium and the diammonium salts.

As already indicated, the new compounds, when applied directly to cellulosic fiber, impart thereto an intense whitish-blue fluorescence. Their more important practical value, however, resides in their capacity to shade the fluorescence obtainable by those water-soluble blue to blue-violet fluorescent agents now on the market which by themselves tend to introduce a pinkish cast. As little as 20 parts by weight of the novel compound to 80 parts by weight of the disodium salt of 4,4'-bis(2,4-dimethoxy-benzoylamino)- or 4,4'-bis(phenyl-ureido)-stilbene-2,2'-disulfonic acid suffices to overcome the pinkish cast, endowing the cellulosic fiber with a more pure white appearance in ordinary daylight. Of course, the quantity admixed may be varied within wide limits, say from 10 to 50%, depending on the preference of the ultimate consumer.

The composite fluorescent agents thus obtained possess essentially uniform exhaust qualities and good fastness to bleach. To further facilitate their application to textile fiber, the composite agents may be incorporated in soap flakes or artificial detergents, as is already well known in conjunction with the fluorescent agents now on the market.

Other variations and modifications will readily appear to those skilled in this art.

I claim as my invention:

1. A compound selected from the group consisting of 4,4'-bis(3-methoxy-2-naphthoylamino)-stilbene-2,2'-disulfonic acid and its water-soluble salts.

2. The disodium salt of 4,4'-bis(3-methoxy-2-naphthoylamino)-stilbene-2,2'-disulfonic acid.

3. A fluorescence agent for cellulosic fiber comprising an admixture of about 90 to 50 parts by weight of 4,4'-bis(2,4-dimethoxy-benzoylamino)-stilbene-2,2'-di(sodium-sulfonate) and about 10 to 50 parts by weight of 4,4'-bis(3-methoxy-2-naphthoylamino)-stilbene-2,2'-di(sodium-sulfonate).

STANLEY EARL KRAHLER.

REFERENCES CITED

The following references are of record in the file of this patent:

UNITED STATES PATENTS

| Number | Name | Date |
|---|---|---|
| 2,341,009 | Axelrad | Feb. 8, 1944 |
| 2,468,431 | Eberhart | Apr. 26, 1949 |